(12) United States Patent
Olesen et al.

(10) Patent No.: US 11,139,568 B2
(45) Date of Patent: Oct. 5, 2021

(54) ANTENNA ISOLATION ENHANCEMENT

(71) Applicant: Intel Corporation, Santa Clara, CA (US)

(72) Inventors: Poul Olesen, Stoevring (DK); Simon Svendsen, Aalborg (DK); Ole Jagielski, Viborg (DK); Farooq Shaikh, Aalborg (DK); Daniel B. Schwartz, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/618,580

(22) PCT Filed: Jun. 30, 2017

(86) PCT No.: PCT/US2017/040471
§ 371 (c)(1),
(2) Date: Dec. 2, 2019

(87) PCT Pub. No.: WO2019/005145
PCT Pub. Date: Jan. 3, 2019

(65) Prior Publication Data
US 2020/0161755 A1    May 21, 2020

(51) Int. Cl.
*H01Q 1/52* (2006.01)
*H01Q 21/24* (2006.01)
*H04B 1/525* (2015.01)

(52) U.S. Cl.
CPC .......... *H01Q 1/525* (2013.01); *H01Q 21/24* (2013.01); *H04B 1/525* (2013.01)

(58) Field of Classification Search
CPC .......... H01Q 1/525; H01Q 21/24; H01Q 5/40; H01Q 5/378; H01Q 9/42; H04B 1/525; H04B 1/00; H04B 1/123
(Continued)

(56) References Cited

U.S. PATENT DOCUMENTS 3,310,802 A * 3/1967 Coleman ................. G01S 13/78
342/44
5,543,721 A * 8/1996 Knuuti ...................... G01R 27/06
324/647
(Continued)

FOREIGN PATENT DOCUMENTS

EP          3185358 A1    6/2017
JP       2015226313 A   12/2015

OTHER PUBLICATIONS

International Search Report for related PCT Application Serial No. PCT/US2017/040471, dated Mar. 29, 2018, 2 pages.

*Primary Examiner* — Eugene Yun
(74) *Attorney, Agent, or Firm* — Schiff Hardin LLP

(57) ABSTRACT

Techniques are disclosed for providing isolation between a pair of partially overlapping antennas. An example electronic device includes a first antenna coupled to a first transceiver through a first signal path comprising a first feed, and a second antenna coupled to a second transceiver through a second signal path comprising a second feed. The first antenna and second antenna partially overlap. The example electronic device also includes compensation circuitry coupled to the first signal path and the second signal path and configured to generate a compensation signal that provides analog cancellation of an interference signal received at the second antenna from the first antenna.

22 Claims, 14 Drawing Sheets

(58) Field of Classification Search
USPC .................................................. 455/562.1
See application file for complete search history.

(56) References Cited

U.S. PATENT DOCUMENTS

| | | |
|---|---|---|
| 2009/0227213 A1 | 9/2009 | Heuermann et al. |
| 2010/0311494 A1* | 12/2010 | Miller ............... G07F 17/3223 |
| | | 463/22 |
| 2011/0256857 A1 | 10/2011 | Chen et al. |
| 2012/0264381 A1 | 10/2012 | Eisenhut et al. |
| 2013/0141296 A1* | 6/2013 | Jaffri .................. H01Q 13/18 |
| | | 343/770 |
| 2013/0203363 A1* | 8/2013 | Gratt .................. H04B 1/3838 |
| | | 455/73 |

* cited by examiner

200

300

700

__

ANTENNA ISOLATION ENHANCEMENT

CROSS REFERENCE TO RELATED APPLICATIONS

Pursuant to 35 U.S.C. § 371, this application is the United States National Stage Application of International Patent Application No. PCT/US2017/040471, filed on Jun. 30, 2017, the contents of which are incorporated by reference as if set forth in their entirety herein.

TECHNICAL FIELD

This disclosure relates generally to techniques for improving isolation between antennas in devices containing multiple independent RF systems. Such devices may include mobile computing devices such as laptop computers, tablet computers, smart watches and bracelets, Internet or Things (IoT) devices, and the like.

BACKGROUND

The number of integrated wireless technologies included in mobile computing devices is increasing. These wireless technologies include, but are not limited to, WIFI, WiGig, and Wireless Wide Area Network (WWAN) technologies such as Long-Term Evolution (LTE). Each wireless technology specifies certain certification standards that pertain to antenna isolation. At the same time, the available space within the device for the antennas that support these wireless technologies is shrinking, making it more difficult to maintain suitable antenna isolation. Radio Frequency (RF) filters such as Surface Acoustic Wave (SAW) filters are often used to provide antenna isolation. However, such devices add complexity and cost to the design of the system. Additionally, RF filters usually require some frequency separation for proper operation. Therefore, RF filters may not be suitable for adjacent frequency bands with no guard band between them.

BRIEF DESCRIPTION OF DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

The subject matter disclosed herein relates to techniques for improving isolation between antennas. There are multiple scenarios in which antenna isolation goals are difficult to achieve depending on the size of the form factor available for the antennas and the frequency bands in use. For example, it may be desirable for a small form factor device such as smart bracelet to support WiFi and cellular functionality. In such as small device, the inherent antenna isolation between the WiFi antenna and the cellular antenna may be as low as 5 to 8 decibels (dB). Current front-end solutions that rely on RF filters may not be suitable for improving the antenna isolation due to the inadequacy of the guard bands between the operable frequency bands. For example, there is no guard band between the ISM band (2400 MHz to 2483.5 MHz) used for 2.4 GHz WiFi and LTE band 40 (2300 MHz to 2400 MHz), and there is only a 12.5 MHz guard band between the ISM band and LTE band 41 (2496 MHz to 2690 MHz). As such, current RF front-end solutions that make use of SAW filters, BAV filters, or FBAR filters for WiFi and cellular bands do not provide sufficient co-existence performance.

The present disclosure describes a technique for enhancing antenna isolation. Embodiments of the present techniques include a pair of antennas which partly share the same volume and exhibit a high inherent isolation. Additionally, the antenna feed system is constructed to provide analog compensation, which further enhances the antenna isolation of the system. The combination of the two RF isolation techniques provides high enough isolation to deal with transmission noise in the frequency band of the receiving device. For example, the present techniques are able to provide more than 40 dB RF isolation between WiFi and LTE RF transceiver ports within in a very small form factor.

Additionally, the techniques described herein provide high levels of isolation without the use of RF filters such as SAW filters. The analog compensation system includes only passive components such as RF switches, capacitors, and inductors and does not use signal amplification. Thus, current consumption, linearity distortion, and signal noise are not significant. The circuitry can therefore easily be combined with existing RF transceiver front-end circuitry and topologies without any hardware modifications to those systems. In some embodiments, the analog compensation is configured to be tunable. In this way, the analog compensation can respond to the operation conditions of the wireless systems to provide enhanced performance under certain operating conditions.

Figure 1:
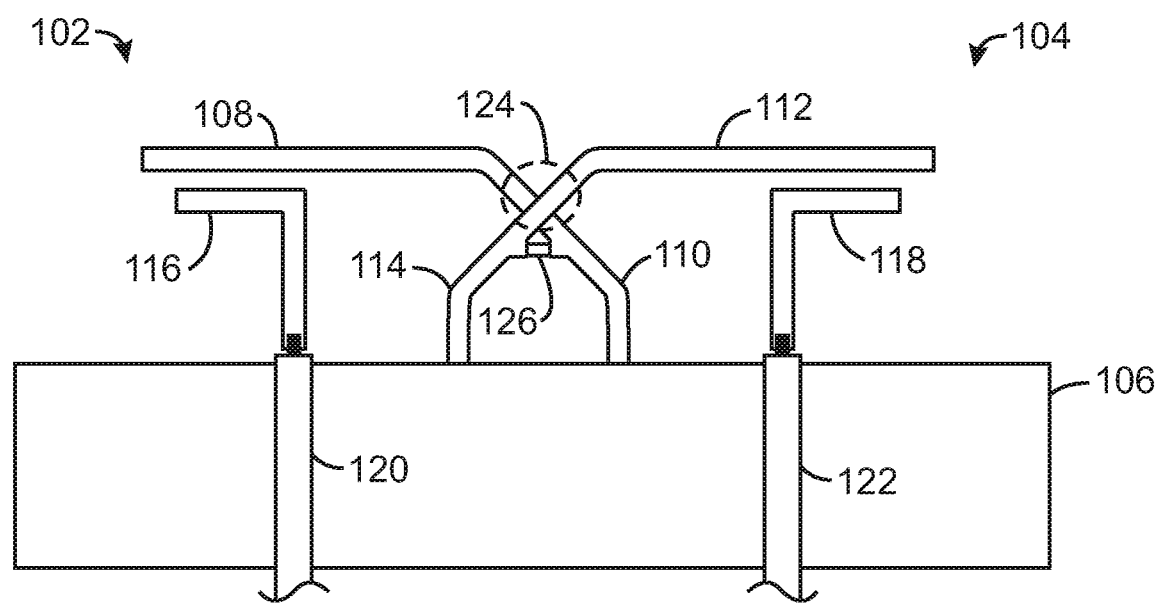
FIG. 1 is a diagram of an antenna system that provides enhanced isolation.

FIG. 1 is a diagram of an antenna system that provides enhanced isolation. The antenna system 100 includes a pair of overlapping antennas, referred to herein as first antenna 102 and second antenna 104. The term "overlapping" refers to the fact that a portion of one antenna crosses over a portion of the other antenna such that the two antennas at least partly occupy a common area of the antenna plane. Both antennas 102 and 104 are conductively coupled to a common ground plane 106. The antenna system may be fabricated as planar structure, for example, in one or more layers of a printed circuit board (PCB) or may be formed from metal wires or strips and the like. Antenna 102 includes a resonant element 108 and a ground arm 110 coupled to the ground plane 106. Antenna 104 includes a resonant element 112 and a ground arm 114 coupled to the ground plane 106. In some embodiments, a passive circuit element such as an inductor (not shown) may be coupled in series between the resonant element and the ground plane, for example, between the ground arm 110, 114 and the ground plane 106.

Each antenna 102 and 104 is fed using an indirect feeding technique, wherein the feed is capacitively or inductively coupled to the antenna's resonant element. Accordingly, the system includes a first feed element 116 capacitively coupled to the resonant element 108 of the first antenna 102, and a second feed element 118 capacitively coupled to the resonant element 112 of the second antenna 104. Each feed element is conductively coupled through a transmission line 120 and 122 to a respective transceiver of a respective communication subsystem. The transceiver may be a circuit module mounted on the circuit board that provides integrated transmission and reception capabilities. However, the term transceiver as used herein more broadly refers to a circuit module that can provide reception capability, or transmission capability, or both.

The first antenna 102 overlaps the second antenna 104 at the overlap point 124. At the overlap point 124, the first ground arm passes under the second ground arm without making electrical contact. A conductive insulator may be interposed between the antennas at the overlap point 124 to prevent electrical contact. In some examples, electrical contact may be avoided by disposing all of a portion of the first antenna in a separate layer of a multilayer PCB.

Each resonant element may be approximately a quarter wavelength long. For example, if the antennas operate at 2.4 Gigahertz, each resonant element may be approximately 30 millimeters. The resonant elements may extend approximately 6 millimeters out from the ground plane.

The antenna system 100 also includes a choke element 126 disposed in close proximity to the overlap point 124. The choke element is a passive electrical component such as a capacitor or inductor through which the two antennas are coupled. In the example shown in FIG. 1, the choke element 126 couples the first ground arm to the second ground arm just below the two resonant elements. The choke element 126 electrically decouples the two antennas by canceling electrical energy received by one resonant element from the other resonant element. In other words, electrical energy received from the first resonant element 108 at the second resonant element 112 is canceled out by energy transferred from the first resonant element 108 to the second resonant element 112 through the choke point 126. The same cancellation applies in the other direction for energy received from the second resonant element 108 at the first resonant element 112.

Each antenna 102 and 104 may operate independently. In some examples, the antenna 102 may be a transmitting antenna and the antenna 104 may be a receiving antenna. In some examples, both antennas operate as transmitters and receivers. The antennas may also operate at the same frequency band or at different frequency bands. For example, the antenna 102 may be configured for LTE cellular communication, while the antenna 104 may be configured for WLAN communication, using a communication protocol such as WiFi. Other configurations are also possible.

The feed system for the antennas is configured to provide analog compensation to further isolate the antennas 102 and 104. Various example feed systems are described below in relation to FIGS. 2-8.

Figure 2:
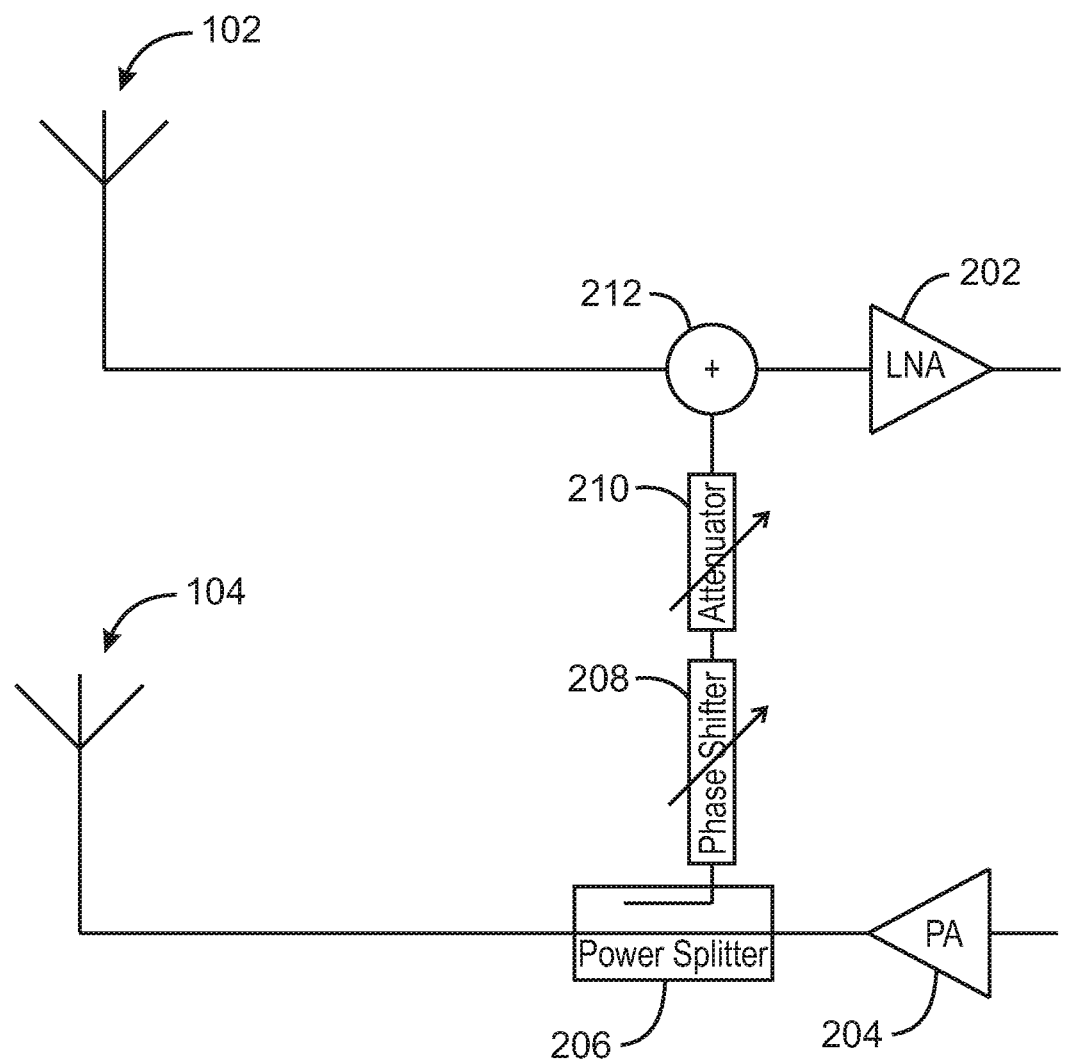
FIG. 2 is an example feed system that provides isolation between a pair of antennas.

FIG. 2 is an example feed system that provides isolation between a pair of antennas. In this example feed system 200, antenna 102 is configured as a receiving antenna and antenna 104 is configured as a transmitting antenna. The receiving antenna 102 is coupled to the input of a Low Noise Amplifier (LNA) 202 and the transmitting antenna is coupled to the output of a power amplifier 204. Both antennas may be WiFi antennas, LTE antennas, or other antennas types. For example, the aggressor may be a WIFI transmitter and the victim may be the receive circuitry of LTE TDD band 40 or 41, or the aggressor may be an LTE transmitter and the victim may be WIFI receive circuitry.

Although the antenna configuration provides some degree of isolation between the antennas 102 and 104, some portion of the signal transmitted by the transmitting antenna 104 will be received by the receiving antenna 102 as an interference signal. In the following examples, the source of the interference is referred to as the aggressor and the receiver of the interference is referred to as the victim.

The analog compensation techniques described herein work by subtracting the aggressor signal in the signal chain before the LNA 202 of the receiver being the victim. To do this, a portion of the transmitted signal is coupled onto a second RF path, referred to herein as the compensation path which includes compensation circuitry. The phase and amplitude of the coupled signal is adjusted, and the adjusted signal is subtracted from the signal received by the receive antenna 102 before it reaches the input of the LNA 202.

As shown in FIG. 2, the output of the power amplifier is coupled to a power splitter 206, which couples a portion of the transmitted signal to the compensation path. The compensation path includes a phase shifter 208 that adjusts the phase of the compensation signal. The phase shifter 208 may be any suitable type of phase shifter and includes passive electrical components such as inductors, variable capacitors, and the like. The phase shifter 208 may be variable to provide adaptive tuning as the transfer function between the antennas will change to due to the effect of the head and hand in handheld devices. However, a fixed phase shifter is also possible for fixed installations where the electromagnetic coupling does not change.

The compensation path is coupled to the signal path of the receiving antenna 102 through the signal combiner 212. The signal combiner 212 may be any suitable type of signal combiner, including a directional coupler or a power splitter, for example. The compensation path may be coupled to the signal path of the receiving antenna 102 at any point before the input of the LNA 202.

The compensation path also includes an attenuator 210 that adjusts the amplitude of the compensation signal. The attenuator 210 may be any suitable type of attenuator such a variable transistor, and the like. In this example, the attenuator 210 is variable. However, a fixed attenuator is also possible. Together, the phase shifter 208 and attenuator 210 adjust the compensation signal to be approximately equal in amplitude and shifted in phase by 180 degrees compared to the signals received by the receive antenna 102.

In some examples, a high Q-factor filter such as a SAW filter may be included between the signal combiner 212 and the LNA 202. The phase response for such high Q-factor filters is very rapid and difficult to predict and model, particularly at the band edge. Combining the compensation signal into the received signal chain before it enters any high Q front end filters makes it possible tune the compensation signal without regard for the phase response of the high Q filter. The phase response of antennas typically used in mobile devices are much slower due to much lower Q in the frequency response between the antennas. However, the phase response and amplitude response between two antennas may vary depending on the electromagnetic environment which changes due to user interaction. Accordingly, the phase shifter 208 and attenuator 210 may be adjustable so that the compensation signal can be adaptively tuned to account for variations in the phase response and amplitude response.

Figure 3:
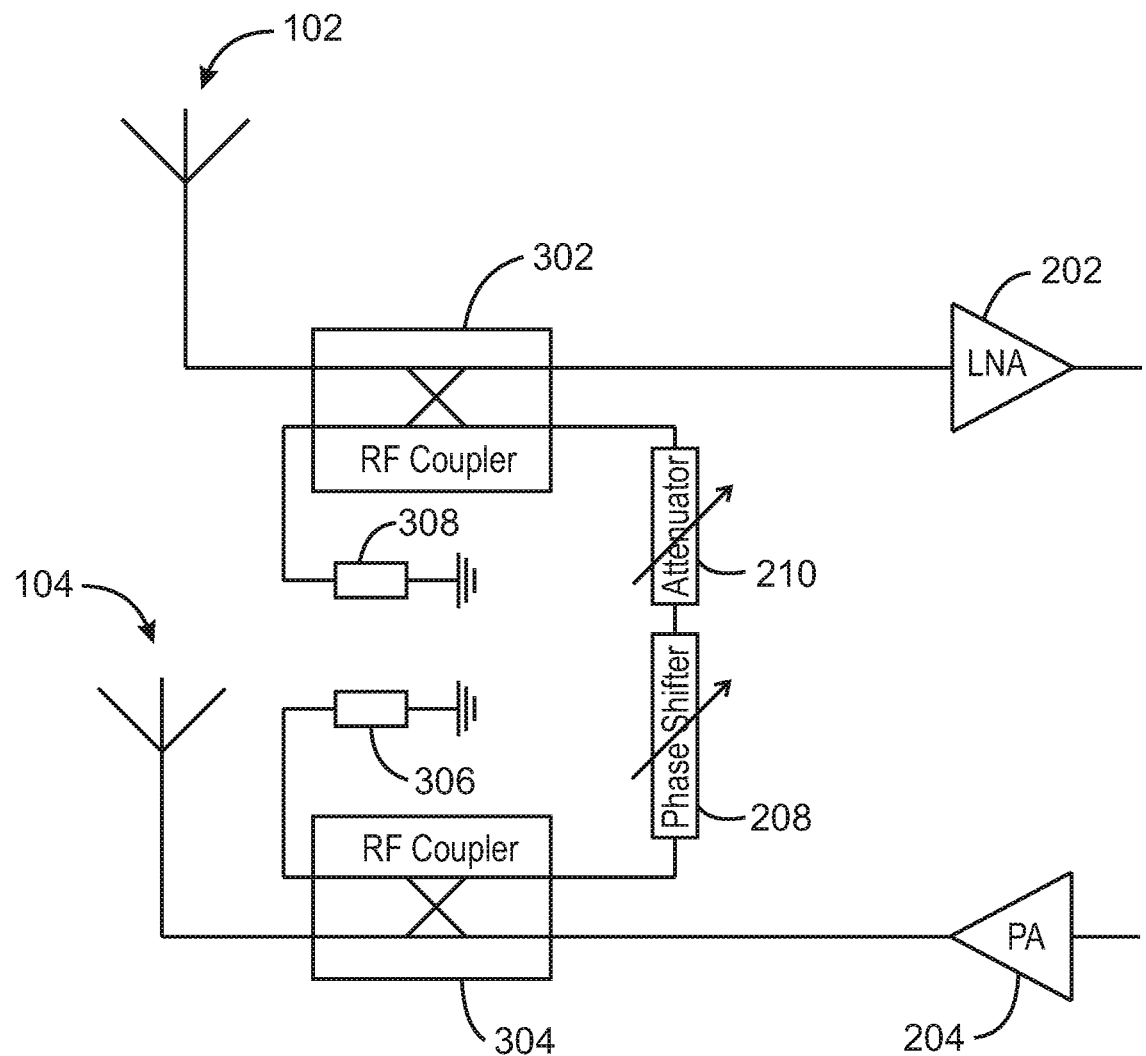
FIG. 3 is another example feed system that provides isolation between a pair of antennas.

FIG. 3 is another example feed system that provides isolation between a pair of antennas. The example feed system 300 is similar to the feed system 200 of FIG. 2 and includes antenna 102 coupled to the input of the LNA 202, antenna 104 coupled to the output of the power amplifier 204, phase shifter 208, and attenuator 210. However, the compensation path is coupled to the signal paths of the receiving antenna and transmitting antenna through a pair of directional RF couplers 302 and 304.

A directional RF coupler is a four-port power coupling device that couples power flowing in one direction. The output by the power amplifier 204 is coupled to the input port of the RF coupler 304. Most of the signal power travels to the antenna 104 through the transmitted port of the RF coupler 304. Some percentage of the signal is transmitted to the compensation path through the coupled port of the RF coupler 304. The isolated port of the RF coupler is coupled to ground through a resistor 306. The percentage of the transmitted signal that is coupled to the compensation path is determined by the RF coupler's coupling factor, which may be fixed or variable.

The RF coupler 302 couples the compensation path to the signal path of the receiving antenna. The output of the compensation path, e.g., the output of the attenuator 210, is coupled to the input port of the RF coupler 302. A percentage of the compensation signal passes to the transmitted port of the RF coupler 302, which is coupled to ground through resistor 308, and a percentage of the compensation signal is coupled to the input of the LNA 202. The phase shifter 208 and attenuator 210 adjust the compensation signal to be approximately equal in amplitude and shifted in phase by 180 degrees compared to the signals received by the receive antenna 102. Depending on the coupling factor some percentage of the signal received by the antenna 102 will also be couple to ground through the RF coupler 302.

Figure 4:
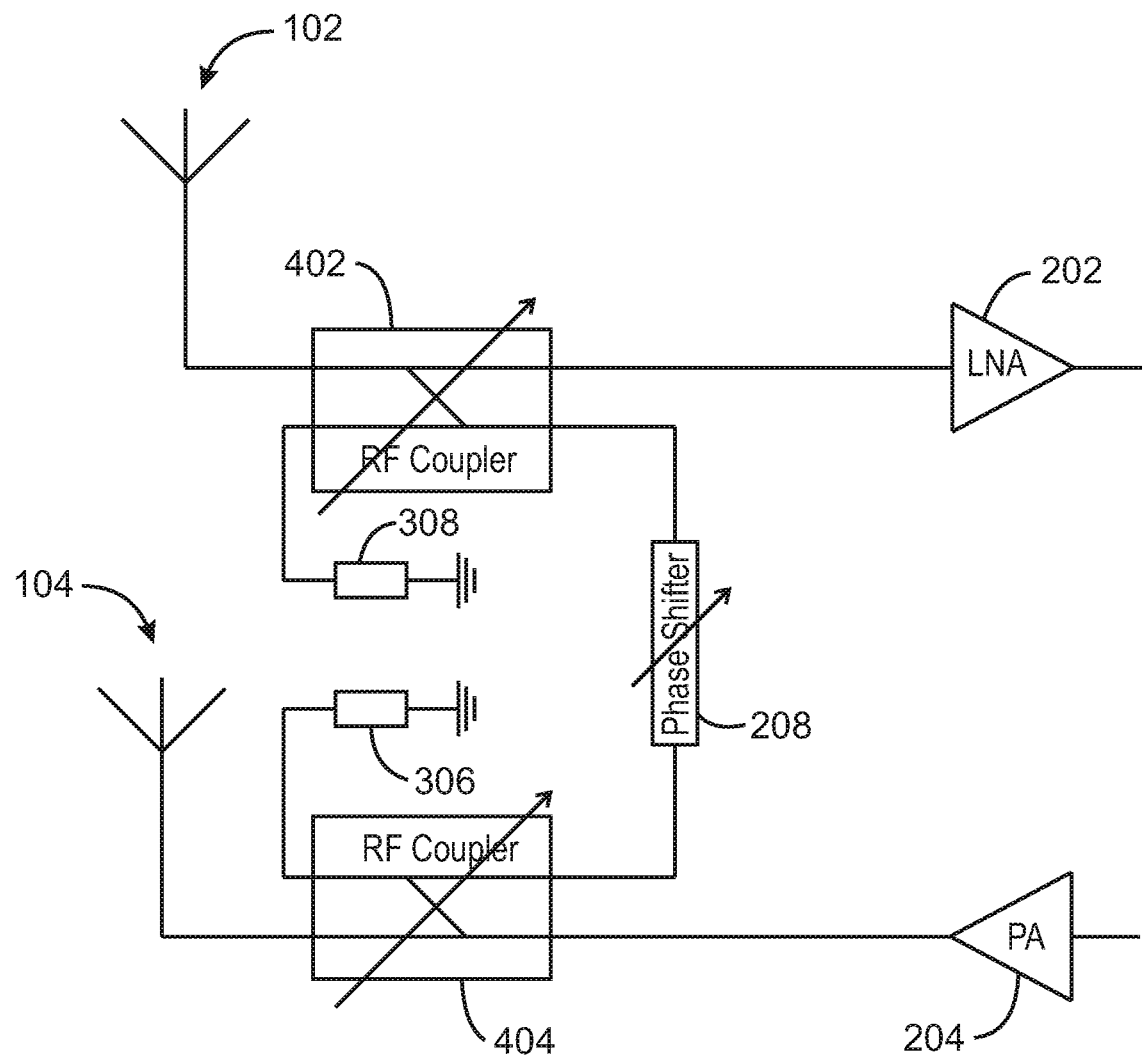
FIG. 4 is another example feed system that provides isolation between a pair of antennas.

FIG. 4 is another example feed system that provides isolation between a pair of antennas. The example feed system 400 is similar to the feed system 300 of FIG. 3 and includes antenna 102 coupled to the input of the LNA 202, antenna 104 coupled to the output of the power amplifier 204, phase shifter 208, and RF couplers 402 and 404 to couple the compensation path to the signal paths of the receiving antenna and transmitting antenna. However, in the example feed system 400, the coupling factor of the RF couplers 402 and 404 is adjustable, and the amplitude of the compensation signal coupled to the signal path of the receiving antenna 102 is controlled by one or both RF couplers 402 and 404 rather than a separate attenuator.

Figure 5:
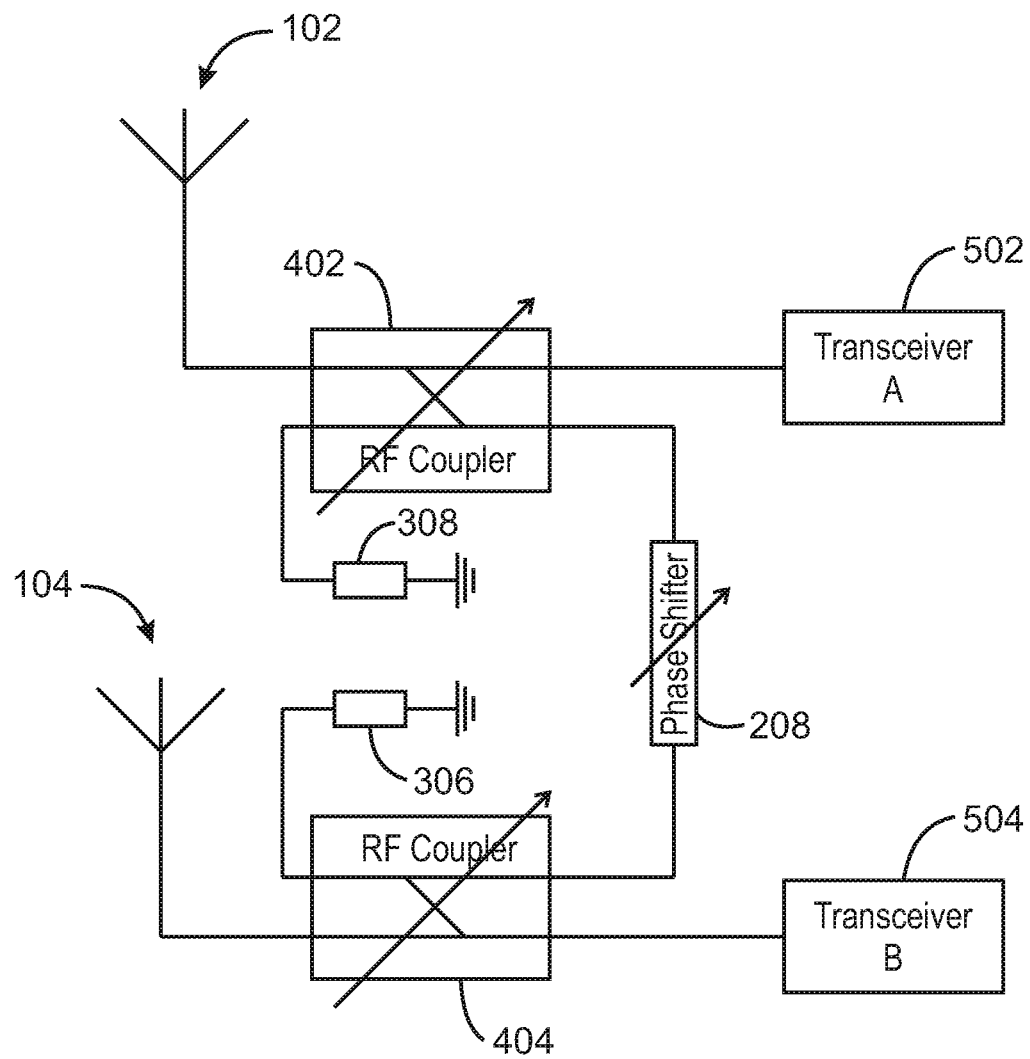
FIG. 5 is another example feed system that provides isolation between a pair of antennas.

FIG. 5 is another example feed system that provides isolation between a pair of antennas. The example feed system 500 is similar to the feed system 400 of FIG. 4 and includes antenna 102, antenna 104, phase shifter 208, and a pair of directional RF couplers 302 and 304 to couple the compensation path to the signal paths of the receiving antenna and transmitting antenna. Additionally, the coupling factor of the RF couplers 402 and 404 is adjustable, and the amplitude of the compensation signal coupled to the signal path of the receiving antenna 102 is controlled by one or both RF couplers 402 and 404 rather than a separate attenuator.

In the feed system 500, antenna 102 is coupled to a first transceiver, referred to herein as transceiver A 502, and antenna 104 is coupled to a second transceiver, referred to herein as transceiver B 504. Transceiver A 502 and transceiver B 504 may be configured for any suitable type of wireless communication protocol. For example, Transceiver A 502 may be an LTE front-end module and transceiver B 504 may be a WiFi module. Other configurations are also possible.

Transceiver A 502 and transceiver B 504 are both capable of transmitting and receiving wireless signals separately. Accordingly, each transceiver may be a source of interference for the other transceiver, depending on the communication occurring at any given time. The feed system 500 is symmetric so that when the aggressor and victim roles are switched between the transceivers no additional RF switching needs to be performed to provide suitable isolation for both transceivers. Additionally, no DC power is dissipated due to resistive attenuators or power splitters.

The feed system 500 may be configured to be adjusted based on the current activity of the two wireless communication systems as characterized by the transmitted power levels of the two transceivers, the frequency bands at which the transceiver are operating, and others. Additionally, both couplers can be tuned symmetrically or non-symmetrically to improve system performance for lowest power consumption or best RF performance. For example, there may be times when transceiver A and transceiver B are operating at frequencies that provide a wide guard band. In such a scenario, high levels of additional compensation above the inherent isolation provided by the antennas themselves may not be needed. Accordingly, the coupling factors of both RF couplers could be reduced, thereby reducing the magnitude of the compensation signal and reducing the RF power loss through the RF couplers.

In some examples, the RF couplers may be tuned asymmetrically to increase the sensitivity of one transceiver over another. Increasing the coupling factor of RF coupler 402 and reducing the coupling factor of RF coupler 404 will tend to increase the sensitivity of transceiver B, by reducing the power loss through coupler 404 while maintaining the same level of cancellation on the receive signal path of transceiver B. The tradeoff is that power loss through coupler 402 will be increased. Such a tradeoff may be beneficial if the received signal strength at transceiver A is higher than the received signal strength at transceiver B.

Figure 6:
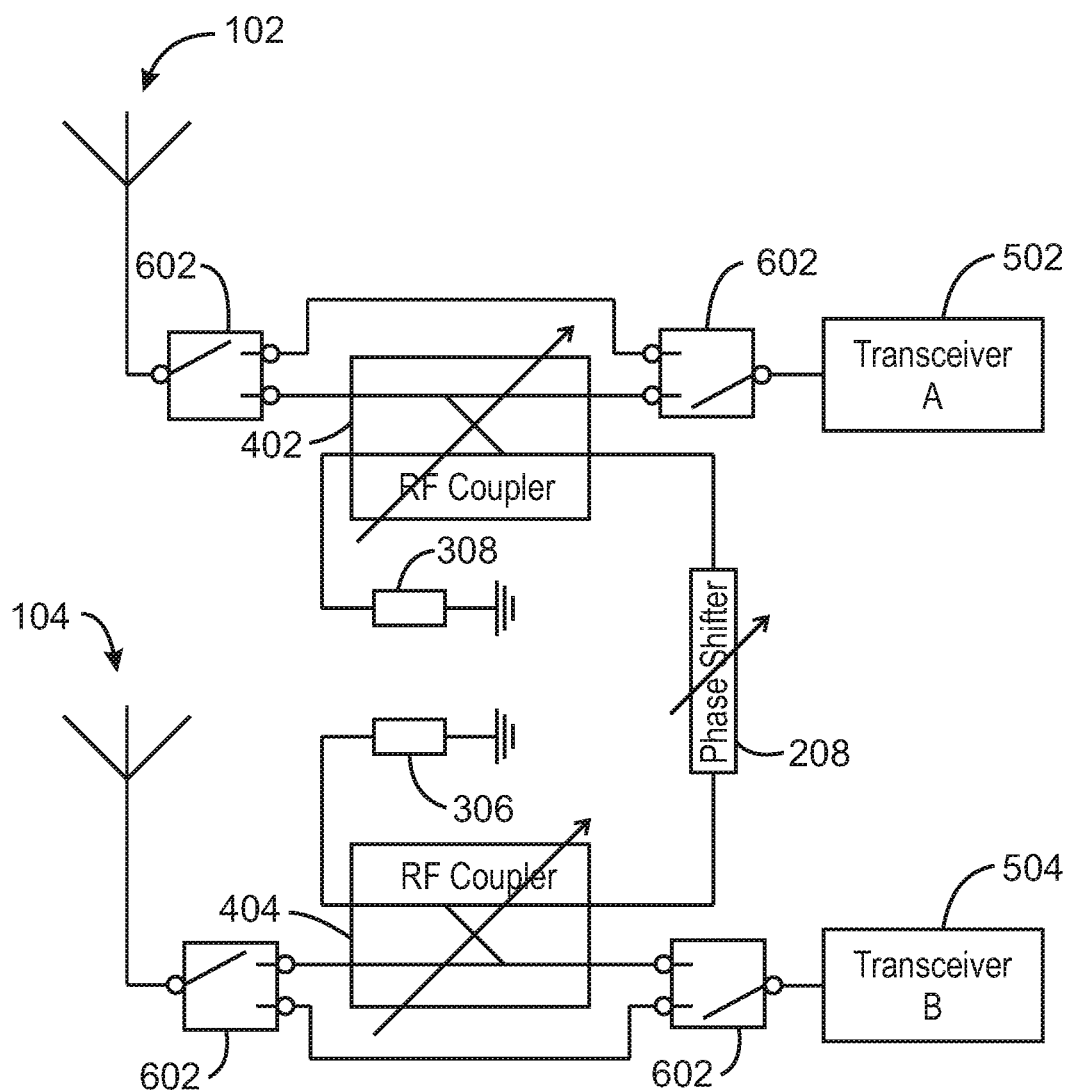
FIG. 6 is another example feed system that provides isolation between a pair of antennas.

FIG. 6 is another example feed system that provides isolation between a pair of antennas. The example feed system 600 is similar to the feed system 600 of FIG. 5 and includes antenna 102, antenna 104, phase shifter 208, and a pair of adjustable directional RF couplers 302 and 304 to couple the compensation path to the signal paths of the receiving antenna and transmitting antenna. The amplitude of the compensation signal coupled to the signal path of the receiving antenna 102 is controlled by one or both RF couplers 402 and 404. Additionally, antenna 102 is coupled to a transceiver A 502, and antenna 104 is coupled to transceiver B 504, each of which may be configured for any suitable type of wireless communication protocol.

The feed system 600 also includes a set of bypass switches 602 configure to decouple the compensation path when operating conditions of the two transceivers are suitable. For example, the compensation path may be decoupled when transceiver A and transceiver B are operating at frequencies that provide a wide guard band, or when the power loss through the RF couplers is determined to be detrimental. The bypass switches 602 may be switched in unison to couple or decouple the RF couplers. Decoupling the RF couplers disengages the compensation path and eliminates the power loss through the RF couplers.

Figure 7:
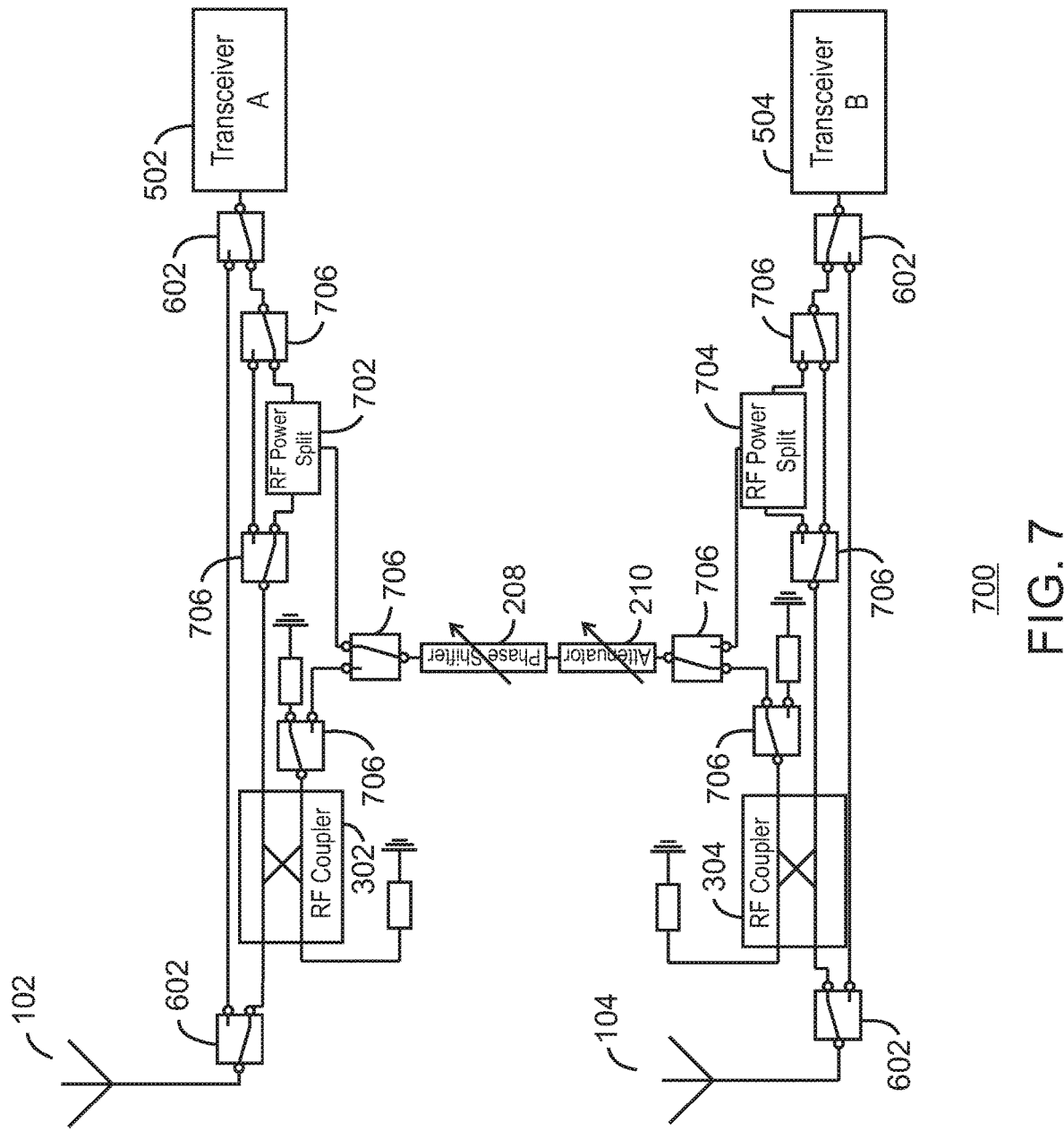
FIG. 7 is another example feed system that provides isolation between a pair of antennas.

FIG. 7 is another example feed system that provides isolation between a pair of antennas. In some cases, depending on the design of the RF couplers, the insertion loss in the RF couplers may be high. The example feed system 700 reduces the losses in the system by coupling the signal path of the aggressor to the compensation path through an RF splitter rather than an RF coupler. The example feed system 700 includes antenna 102 coupled to transceiver A 502 and antenna 104 coupled to transceiver B 504. The amplitude and phase of the compensation signal is controlled by an adjustable phase shifter 208 and adjustable attenuator 210. The signal paths of the antennas 102 and 104 are coupled to the compensation path by power splitters 702 and 704 and RF couplers 302 and 304. The power splitters may be fixed (i.e., non adjustable) asymmetric resistive power splitters.

The feed system 700 includes a switching complex that is configurable to adjust the compensation scheme according to the activity of the two wireless communication systems. Switches 602 are bypass switches that may be controlled to engage or disengage the compensation path during times when additional compensation is not needed. Switches 706 may be controlled to complete the appropriate compensation path when compensation is turned on. The switch settings shown in FIG. 7 are the switch settings that will be activated when the transceiver A is behaving as an aggressor toward transceiver B. In this configuration of switch settings, power from the transceiver A is output to the RF power splitter 702, and a portion of the transmitted power is diverted to the compensation path. The compensation signal is then phase adjusted by the phase shifter 208 and amplitude adjusted by the attenuator 210. The phase and amplitude adjusted compensation signal is then output to the RF coupler 304 and combined with the signal path of the antenna 104. The compensated signal then bypasses the RF power splitter 704 and arrives at transceiver B 504. During times in which transceiver B is the aggressor toward transceiver A, the switch settings for switches 706 will be the opposite of what is shown in FIG. 7.

Figure 8:
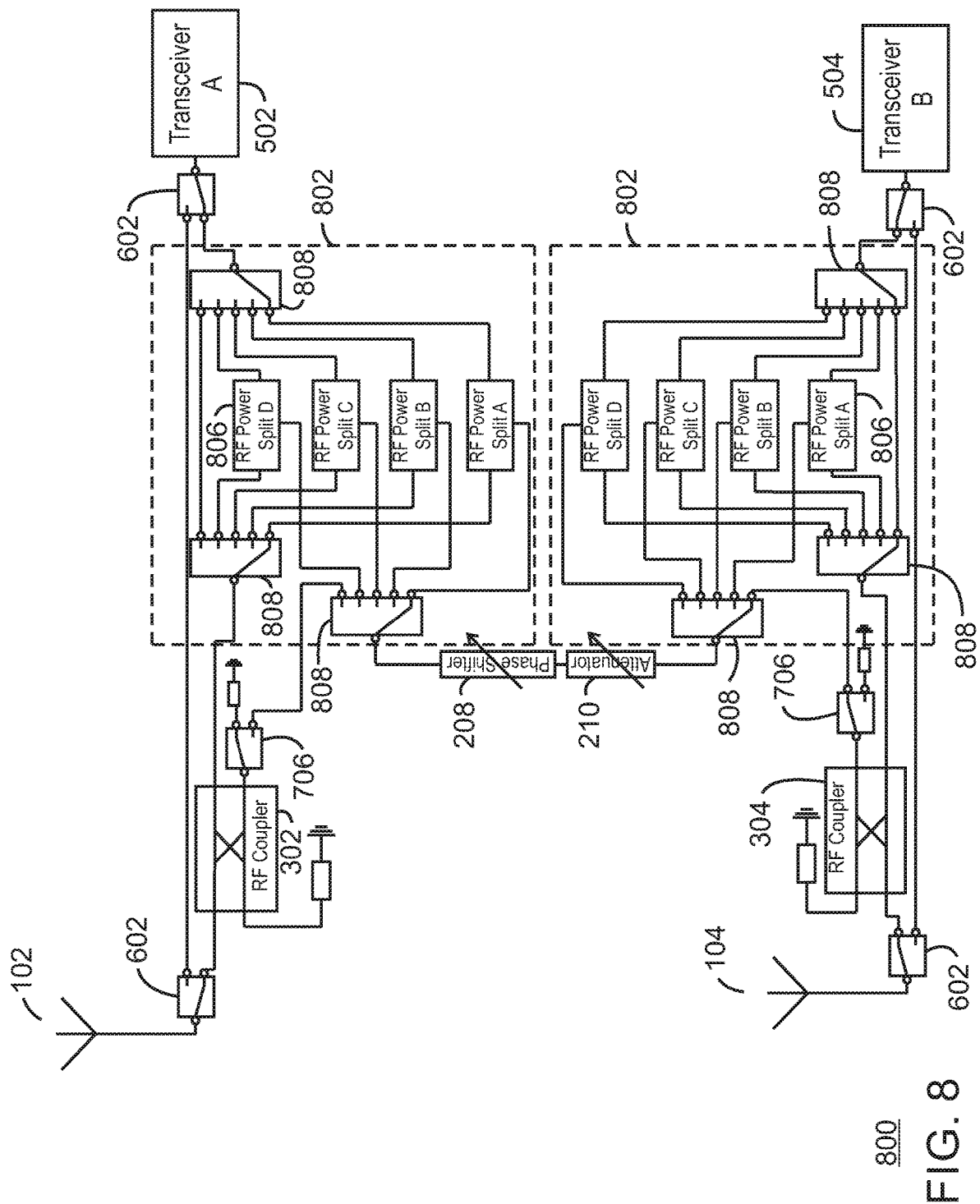
FIG. 8 is another example feed system that provides isolation between a pair of antennas.

FIG. 8 is another example feed system that provides isolation between a pair of antennas. The example feed system 800 is similar to the feed system 700 of FIG. 7 and includes antenna 102 coupled to transceiver A 502, antenna 104 coupled to transceiver B 504, and adjustable phase shifter 208 and attenuator 210 for tuning the compensation signal. The signal paths of the antennas 102 and 104 are coupled the compensation path by RF couplers 302 and 304 and a pair of RF splitter networks 802 and 804.

The RF power splitter networks 802 and 804 include a set of RF power splitters 806 and a set of switches 808 that are controllable to couple a specific RF splitter 806 to the compensation path. Each RF splitter 806 is configured to provide a different power coupling factor. The selection of RF power splitter 806 is used for course tuning of the compensation signal and depends on the level of attention needed to generate a suitable compensation signal. Further tuning of the amplitude of the compensation signal may be performed by the variable attenuator 210. Although four RF power splitters 806 are included in each of the RF power splitter networks 802 and 804 shown in FIG. 6, it will be appreciated that any suitable number of RF power splitters may be included depending on the design of a particular embodiment, including 2, 3, 5 or more RF power splitters.

Switches 602 are bypass switches that may be controlled to engage or disengage the compensation path during times when additional compensation is not needed. The switches 706 may be controlled in coordination with the switches 808 to complete the appropriate compensation path when compensation is turned on depending on which transceiver is the aggressor and which transceiver is the victim.

The switch settings shown in FIG. 8 are the switch settings that will be activated when the transceiver A is behaving as an aggressor toward transceiver B. In this configuration of switch settings, power from the transceiver A is output to the RF power splitter A, and a portion of the transmitted power is diverted to the compensation path. The compensation signal is then phase adjusted by the phase shifter 208 and amplitude adjusted by the attenuator 210. The phase and amplitude adjusted compensation signal is then output to the RF coupler 304 and combined with the signal path of the antenna 104. The compensated signal then bypasses the RF power splitter network 804 and arrives at transceiver B 504. During times in which transceiver B is the aggressor toward transceiver A, the switch settings for switches 706 and 808 will be the opposite of what is shown in FIG. 8.

Figure 9:
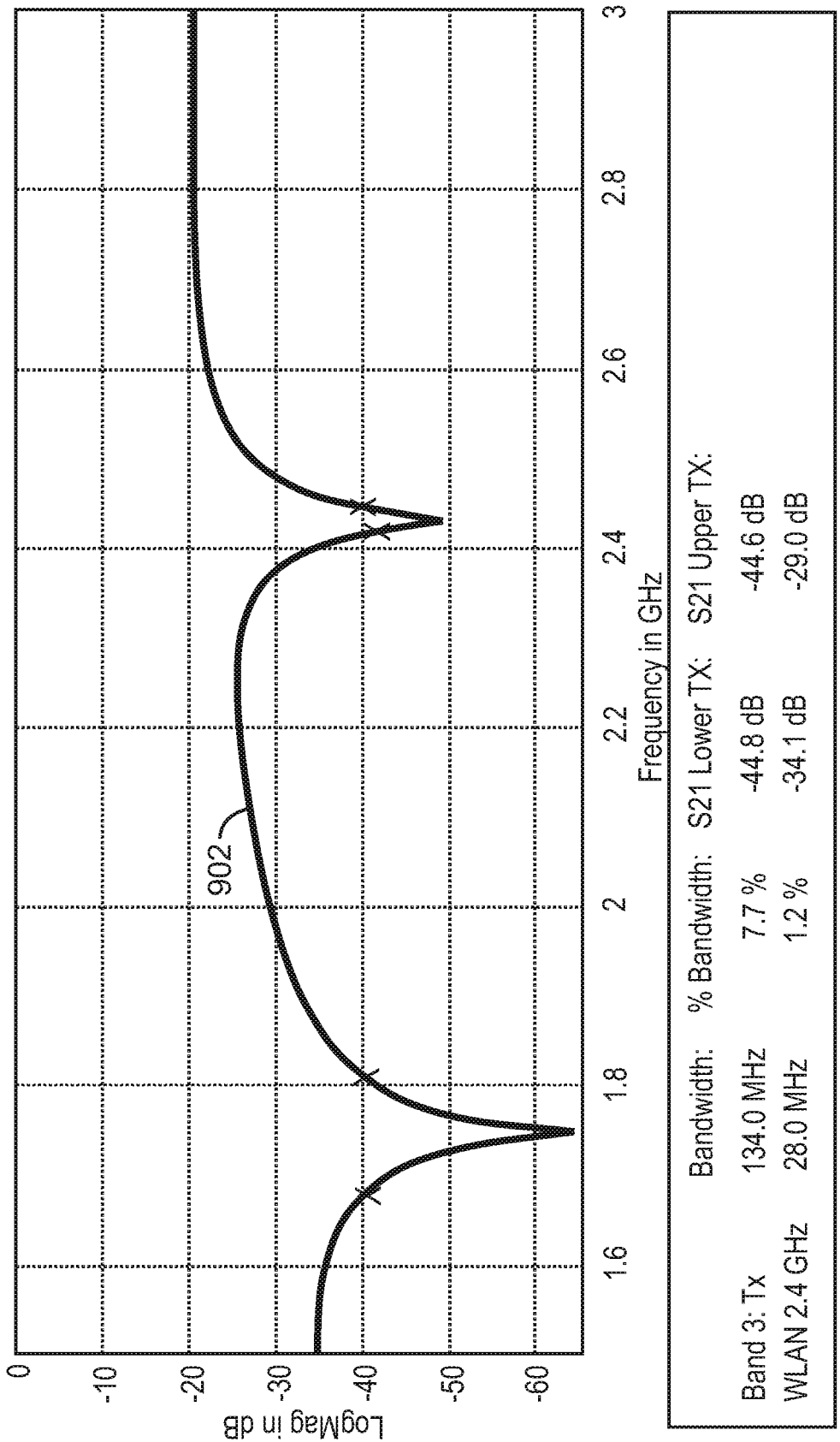
FIG. 9 is a graph illustrating simulated isolation characteristics for a pair of antennas partly sharing the same volume and fed by an antenna feed system configured to provide additional analog compensation.

FIG. 9 is a graph illustrating simulated isolation characteristics for a pair of antennas partly sharing the same volume and fed by an antenna feed system configured to provide additional analog compensation. The line 902 shows the signal level, S21, received at the victim from the aggressor. The antennas system represented in FIG. 9 is tuned to provide high levels of isolation between the antennas at the 2.4 Gigahertz (GHz) WiFi band and the LTE band 3 (1.8 GHz). This configuration may be selected based on the actual operating frequencies of the two antennas, for example, if one antenna is a WLAN antenna operating at 2.4 GHz and the other antenna is operating at LTE band 3.

As can be seen in FIG. 9, approximately 40 to 50 dB of isolation is provided between the antennas across the 2.4 GHz WiFi band. This isolation is due primarily to the physical configuration of the overlapping antennas and the choke element as described in FIG. 1. Additionally, approximately 40 to 60 dB of isolation is provided between the antennas across the LTE band 3. The isolation in the LTE band is due primarily to the feed system, which in this example generates a compensation signal phase shifted by 330 degrees. The compensation signal generated by the feed system can be tuned to provide varying isolation characteristics as shown in FIGS. 10-12.

Figure 10:
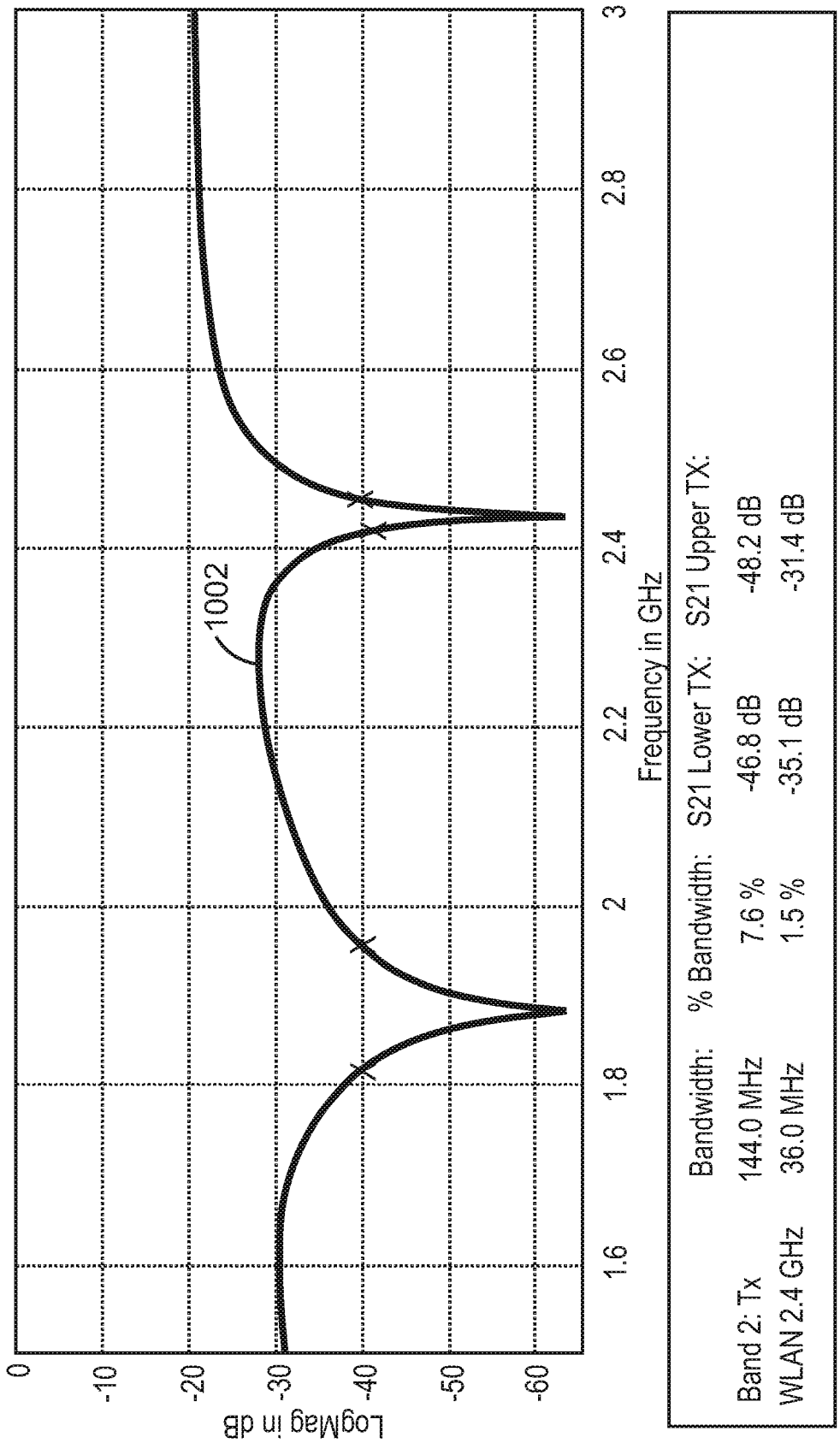
FIG. 10 is a graph illustrating simulated isolation characteristics for a pair of antennas partly sharing the same volume and fed by an antenna feed system configured to provide additional analog compensation.

FIG. 10 is a graph illustrating simulated isolation characteristics for a pair of antennas partly sharing the same volume and fed by an antenna feed system configured to provide additional analog compensation. The line 1002 shows the signal level, S21, received at the victim from the aggressor. The antennas system represented in FIG. 10 is tuned to provide high levels of isolation between the antennas at the 2.4 Gigahertz (GHz) WiFi band and the LTE band 2 (1.9 GHz).

In this example, the feed system generates a compensation signal phase shifted by 290 degrees. This shifts the peak LTE isolation level to LTE band 2 and provides approximately 40 to over 60 dB isolation across the entire LTE band 2. Additionally, the phase shift of the compensation signal improves the isolation across the 2.4 GHz WiFi, providing approximately 40 to over 60 dB isolation.

Figure 11:
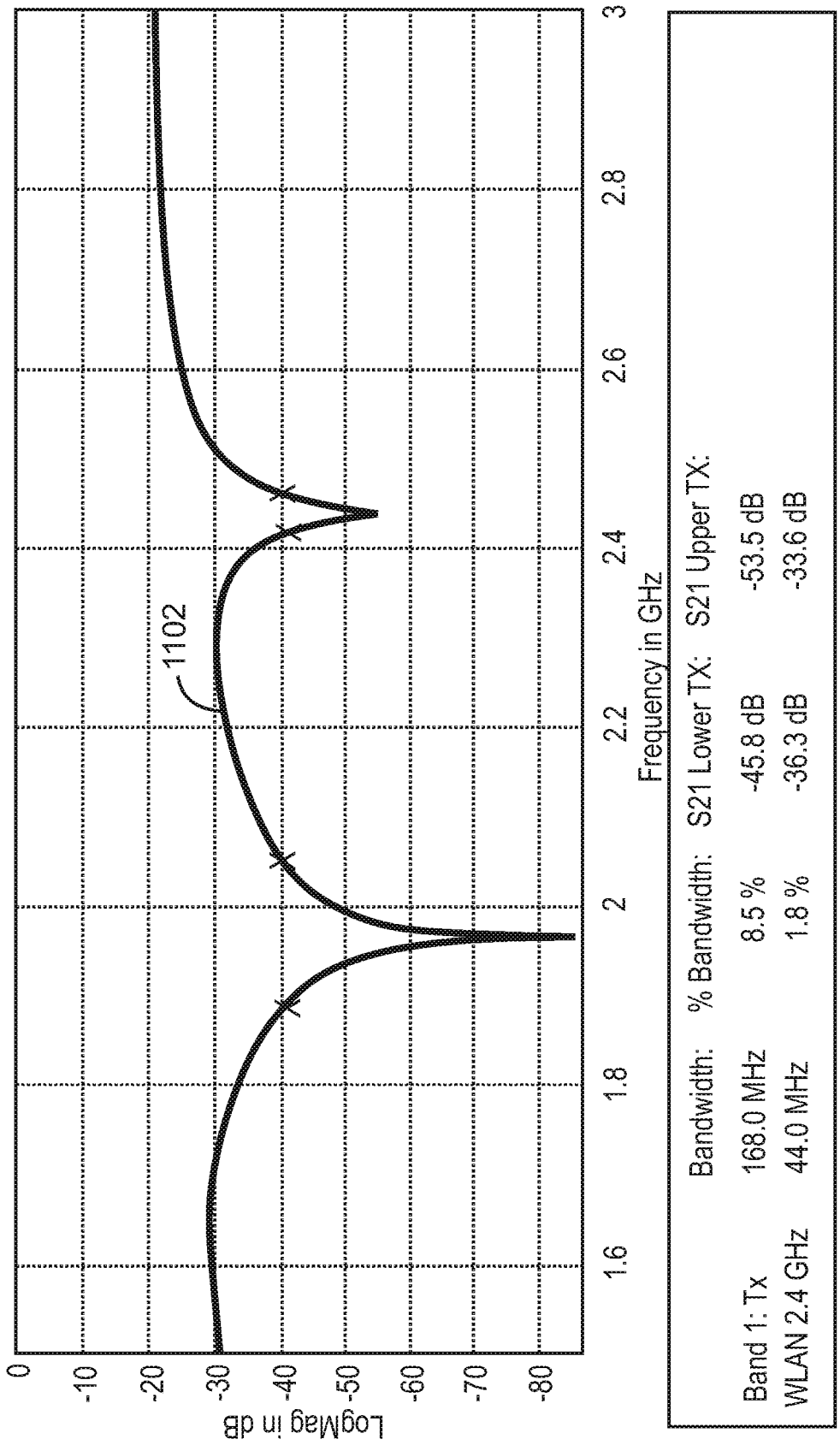
FIG. 11 is a graph illustrating simulated isolation characteristics for a pair of antennas partly sharing the same volume and fed by an antenna feed system configured to provide additional analog compensation.
Figure 12:
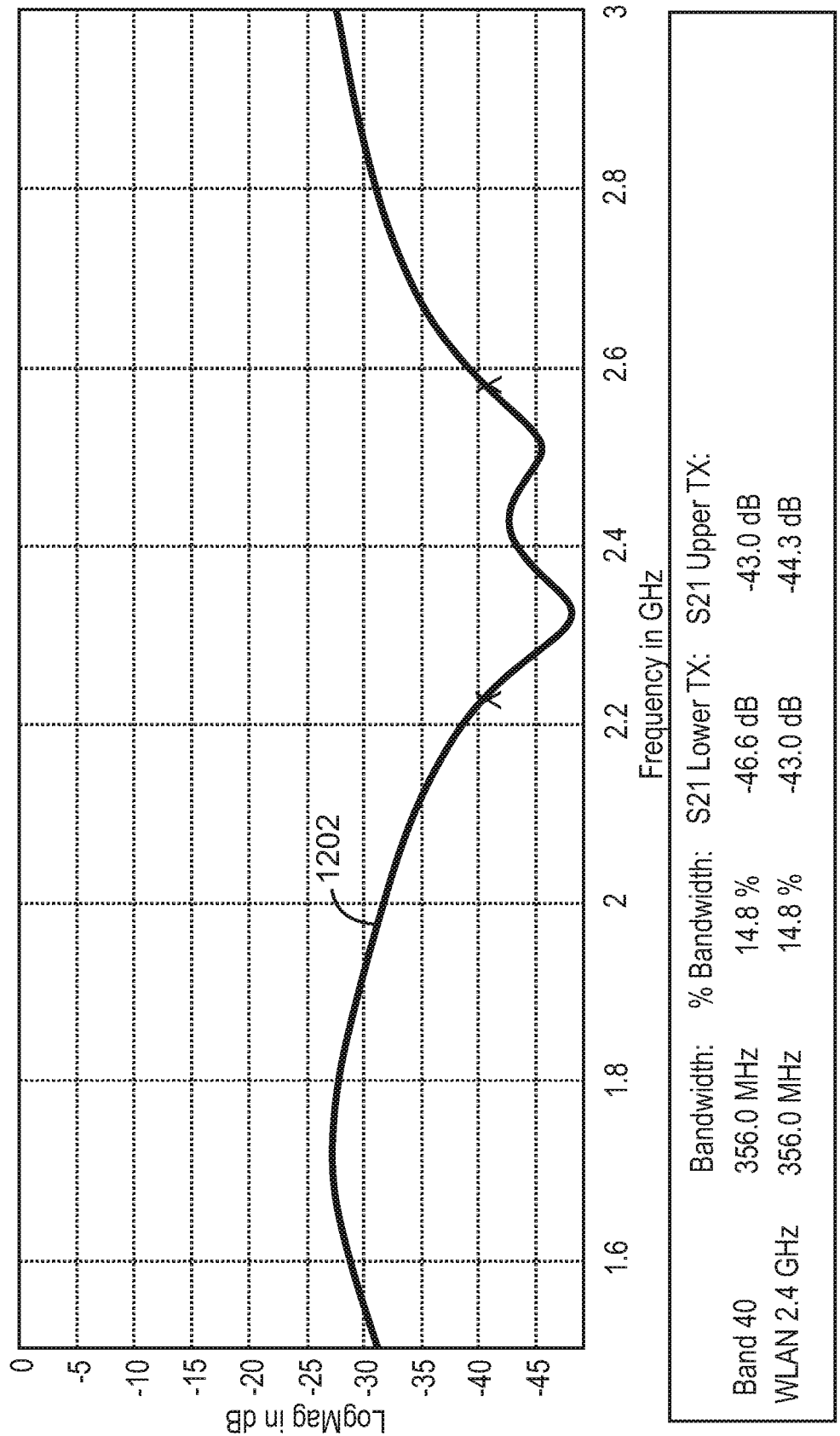
FIG. 12 is a graph illustrating simulated isolation characteristics for a pair of antennas partly sharing the same volume and fed by an antenna feed system configured to provide additional analog compensation.

FIG. 11 is a graph illustrating simulated isolation characteristics for a pair of antennas partly sharing the same volume and fed by an antenna feed system configured to provide additional analog compensation. The line 1102 shows the signal level, S21, received at the victim from the aggressor. The antennas system represented in FIG. 11 is tuned to provide high levels of isolation between the antennas at the 2.4 Gigahertz (GHz) WiFi band and the LTE band 1 (2.1 GHz).

In this example, the feed system generates a compensation signal phase shifted by 270 degrees. This shifts the peak LTE isolation level to LTE band 1 and provides approximately 40 to over 80 dB isolation across the entire LTE band 2. Additionally, the phase shift of the compensation signal reduces the isolation across the 2.4 GHz WiFi, but still provides approximately 40 to 55 dB isolation.

FIG. 12 is a graph illustrating simulated isolation characteristics for a pair of antennas partly sharing the same volume and fed by an antenna feed system configured to provide additional analog compensation. The line 1202 shows the signal level, S21, received at the victim from the aggressor. The antennas system represented in FIG. 12 is tuned to provide high levels of isolation between the antennas at the 2.4 Gigahertz (GHz) WiFi band and the LTE band 40 (2.3 GHz).

In this example, the feed system generates a compensation signal phase shifted by 200 degrees. This shifts the peak LTE isolation level to LTE band 40, which is adjacent to the 2.4 GHz WiFi band. This phase shift results in greater than 40 dB isolation across both bands.

Figure 13:
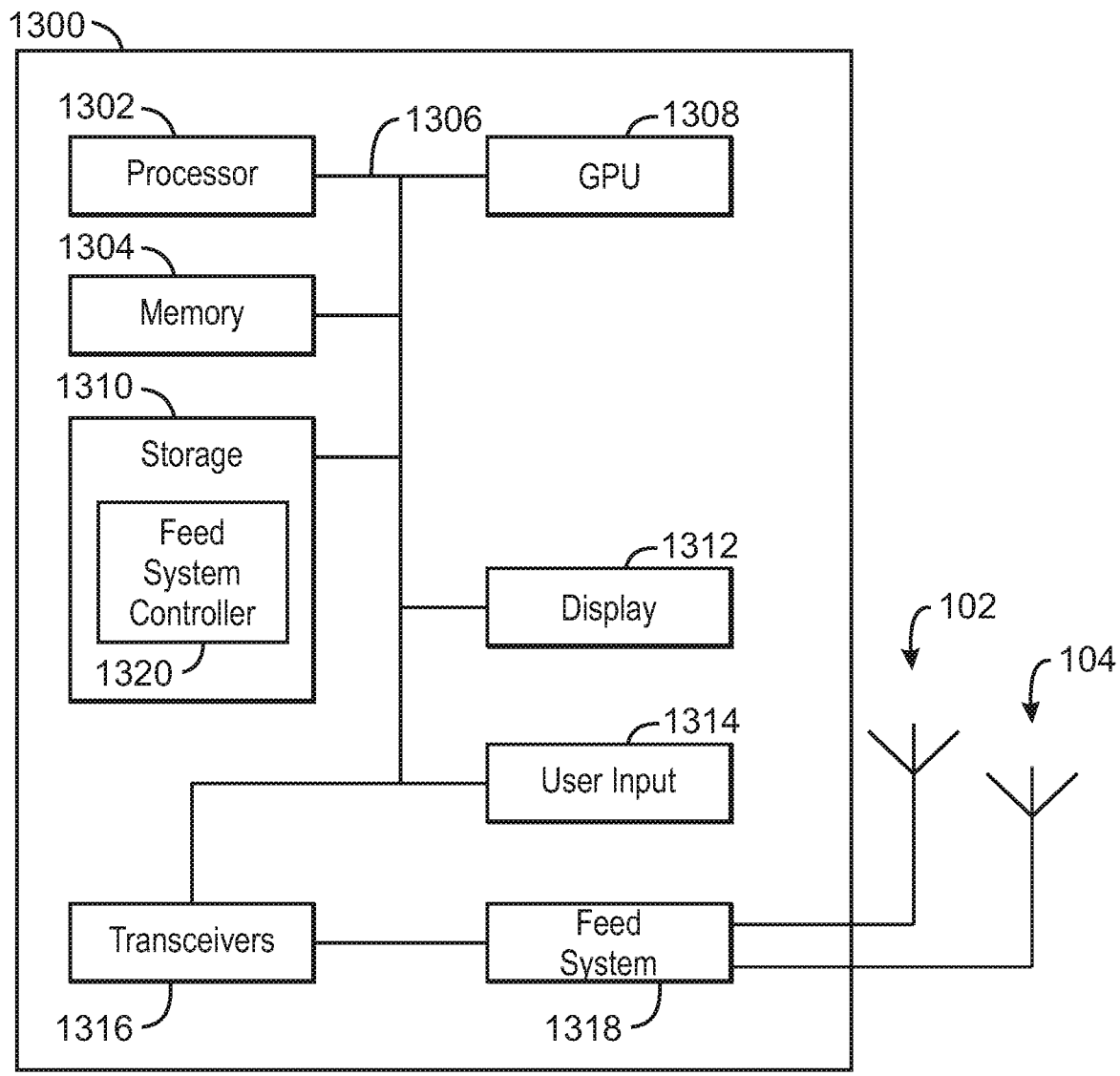
FIG. 13 is a block diagram of an electronic device with a multiple independent RF systems.

FIG. 13 is a block diagram of an electronic device with a multiple independent RF systems. The electronic device 1300 may be, for example, a tablet computer, mobile phone, smart phone, or a smart watch, among others. The electronic device 1300 may include a central processing unit (CPU) 1302 that is configured to execute stored instructions, as well as a memory device 1304 that stores instructions that are executable by the CPU 1302. The CPU may be coupled to the memory device 1304 by a bus 1306. Additionally, the CPU 1302 can be a single core processor, a multi-core processor, a computing cluster, or any number of other configurations. Furthermore, the electronic device 1300 may include more than one CPU 1302. The memory device 1304 can include random access memory (RAM), read only memory (ROM), flash memory, or any other suitable memory systems. For example, the memory device 1304 may include dynamic random access memory (DRAM).

The electronic device 1300 may also include a graphics processing unit (GPU) 1308. As shown, the CPU 1302 may be coupled through the bus 1306 to the GPU 1308. The GPU 1308 may be configured to perform any number of graphics operations within the electronic device 1300. For example, the GPU 1308 may be configured to render or manipulate graphics images, graphics frames, videos, or the like, to be displayed to a user of the electronic device 1300.

The electronic device 1300 can also include a storage device 1310. The storage device 1310 is a non-volatile physical memory such as a hard drive, an optical drive, a flash drive, an array of drives, or any combinations thereof. The storage device 1310 can store user data, such as audio files, video files, audio/video files, and picture files, among others. The storage device 1310 can also store programming code such as device drivers, software applications, operating systems, and the like. The programming code stored to the storage device 1310 may be executed by the CPU 1302, GPU 1308, or any other processors that may be included in the electronic device 1300.

The electronic device 1300 can also include a display 1312 and one or more user input devices 1314, such as switches, buttons, a keyboard, a mouse, or trackball, among others. One of the input devices 1314 may be a touchscreen, which may be integrated with the display 1312.

The electronic device 1300 also includes transceivers 1316 and feed system 1318. The transceivers 1318 may be any of the transceivers described above in FIGS. 1-12. Similarly, the feed system 1318 may be any of the feed systems described above in relation to FIGS. 1-12. The feed system includes the compensation circuitry described above for enhancing the isolation between antennas 102 and 104.

The programming code stored to the storage device 112 may include a feed system controller 1320. The feed system controller 1320 is configured to control the feed system 1318 to adapt the compensation circuitry of the feed system 1320 to changing conditions as described above. For example, the feed system 1318 may be configured to control the compensation circuitry to engage or disengage compensation, adjust the compensation levels, adjust the phase of the compensation signal, and the like. In some examples, rather than being implemented as programming code stored to the storage device 1312, the feed system controller 1320 may be implemented as firmware or logic circuits included in one or more dedicated processors such as an Application Specific Integrated Circuit (ASIC), a Field Programmable Gate Array (FPGA), a System on a Chip (SOC), and combinations thereof.

The block diagram of FIG. 13 is not intended to indicate that the electronic device 1300 is to include all of the components shown in FIG. 13. Rather, the computing system 1300 can include fewer or additional components not shown in FIG. 13, depending on the details of the specific implementation. Furthermore, any of the functionalities of the CPU 1302, or the graphics processor 1308 may be partially, or entirely, implemented in hardware and/or in a processor. For example, the functionality may be implemented in any combination of Application Specific Integrated Circuits (ASICs), Field Programmable Gate Arrays (FPGAs), logic circuits, and the like.

Figure 14:
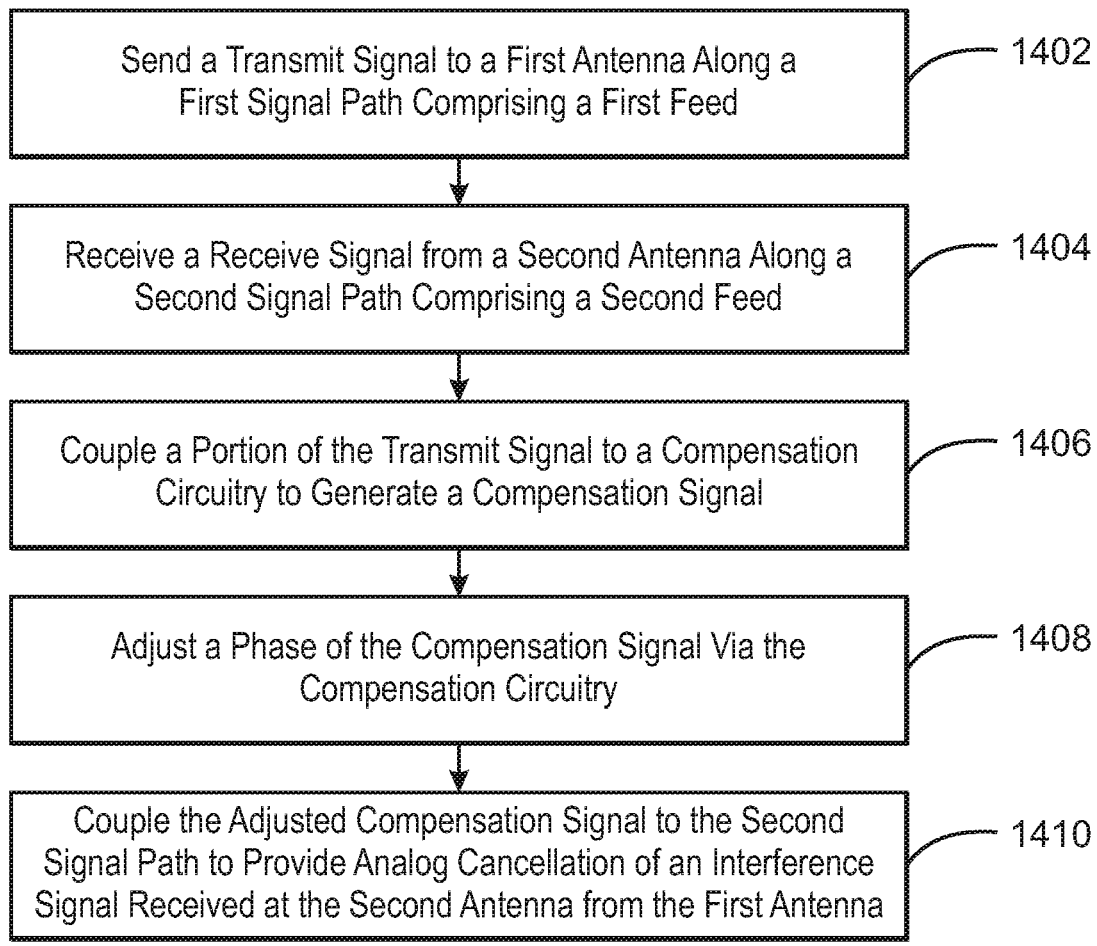
FIG. 14 is a process flow diagram of an example method of operating an electronic device with a multiple independent RF systems.

FIG. 14 is a process flow diagram of an example method of operating an electronic device with a multiple independent RF systems. The method 1400 may be performed by the electronic device 1300 and implemented by circuitry included in the transceivers 1316, the feed system 1318, and the feed system controller 1320. The circuitry may be embodied in hardware, such as logic circuitry or one or more processors configured to execute instructions stored in a non-transitory, computer-readable medium.

At block 1402, a transmit signal is sent to a first antenna along a first signal path comprising a first feed, which may be an indirect feed. At block 1404, a receive signal is received from a second antenna along a second signal path comprising a second feed, which may be an indirect feed. In some examples, the first antenna and second antenna partially overlap as shown in FIG. 1. At block 1406, a portion of the transmit signal is coupled to a compensation circuitry to generate a compensation signal. At block 1408, a phase of the compensation signal is adjusted by the compensation circuitry. At block 1410, the adjusted compensation signal is coupled to the second signal path to provide analog cancellation of an interference signal received at the second antenna from the first antenna.

The method 1400 should not be interpreted as meaning that the blocks are necessarily performed in the order shown. Furthermore, fewer or greater actions can be included in the method 1400 depending on the design considerations of a particular implementation.

EXAMPLES

Example 1 is an electronic device with a plurality of independent Radio Frequency (RF) systems. The system includes a first antenna coupled to a first transceiver through a first signal path including a first feed, and a second antenna coupled to a second transceiver through a second signal path including a second feed. The first antenna and second antenna partially overlap. The system includes compensation circuitry coupled to the first signal path and the second signal path and configured to generate a compensation signal that provides analog cancellation of an interference signal received at the second antenna from the first antenna.

Example 2 includes the system of example 1. In this example, the system includes a choke element that couples the first antenna and the second antenna at a location where the first antenna and the second antenna overlap.

Example 3 includes the system of any one of examples 1 to 2. In this example, the compensation circuitry includes a variable phase shifter, a variable attenuator, a first directional coupler to couple the compensation circuitry to the first signal path, and a second directional coupler to couple the compensation circuitry to the second signal path.

Example 4 includes the system of any one of examples 1 to 3. In this example, the compensation circuitry includes a variable phase shifter, a first adjustable directional coupler to couple the compensation circuitry to the first signal path, and a second adjustable directional coupler to couple the compensation circuitry to the second signal path.

Example 5 includes the system of any one of examples 1 to 4. In this example, the compensation circuitry includes an adjustable directional coupler to couple the compensation circuitry to the first signal path, wherein a coupling factor of the adjustable directional coupler is adjustable to control a magnitude of the compensation signal.

Example 6 includes the system of any one of examples 1 to 5. In this example, the system includes a set of switches to decouple the compensation circuitry from the first signal path and the second signal path.

Example 7 includes the system of any one of examples 1 to 6. In this example, the compensation circuitry includes a Radio Frequency (RF) power splitter to couple the compensation circuitry to the first signal path, and a directional coupler to couple the compensation circuitry to the second signal path.

Example 8 includes the system of any one of examples 1 to 7. In this example, the compensation circuitry includes an RF power splitter network to couple the compensation circuitry to the first signal path and a directional coupler to couple the compensation circuitry to the second signal path, wherein the RF power splitter network includes a plurality of RF power splitters with different power coupling factors, wherein one of the plurality of RF power splitters is selected to provide a course tuning of the amplitude of the compensation signal.

Example 9 includes the system of any one of examples 1 to 8. In this example, the first transceiver is a Wireless Local Area Network (WLAN) transceiver and the second transceiver is a cellular communications transceiver.

Example 10 includes the system of any one of examples 1 to 9. In this example, the compensation circuitry is configured to adjust a phase of the compensation signal depending on an operating frequency of the first transceiver or the second transceiver or both.

Example 11 is a method of operating an electronic device with a plurality of independent Radio Frequency (RF) systems. The method includes sending a transmit signal to a first antenna along a first signal path including a first feed, and receiving a receive signal from a second antenna along a second signal path including a second feed. The first antenna and second antenna partially overlap. The method also includes coupling a portion of the transmit signal to a compensation circuitry to generate a compensation signal; adjusting a phase of the compensation signal via the compensation circuitry. The method also includes coupling the adjusted compensation signal to the second signal path to provide analog cancellation of an interference signal received at the second antenna from the first antenna.

Example 12 includes the method of example 11. In this example, the first antenna and the second antenna are coupled by a choke element at a location where the first antenna and the second antenna overlap.

Example 13 includes the method of any one of examples 11 to 12. In this example, the method includes adjusting a magnitude of the compensation signal via a variable attenuator included in the compensation circuitry.

Example 14 includes the method of any one of examples 11 to 13. In this example, coupling a portion of the transmit signal to the compensation circuitry includes coupling the transmit signal to the compensation circuitry through a directional coupler.

Example 15 includes the method of any one of examples 11 to 14. In this example, coupling a portion of the transmit signal to the compensation circuitry includes coupling the transmit signal to the compensation circuitry through a variable directional coupler, the method including adjusting a coupling factor of the variable directional coupler to adjust a magnitude of the compensation signal.

Example 16 includes the method of any one of examples 11 to 15. In this example, coupling a portion of the transmit signal to the compensation circuitry includes coupling the transmit signal to the compensation circuitry through a Radio Frequency (RF) power splitter.

Example 17 includes the method of any one of examples 11 to 16. In this example, coupling a portion of the transmit signal to the compensation circuitry includes coupling the transmit signal to the compensation circuitry through an RF power splitter network including a plurality of RF power splitters, the method including selecting one of the plurality of RF power splitters provide a course tuning of a magnitude of the compensation signal.

Example 18 includes the method of any one of examples 11 to 17. In this example, the method includes decoupling the compensation circuitry from the first signal path and the second signal path to deactivate the analog cancellation.

Example 19 includes the method of any one of examples 11 to 18. In this example, the first transceiver is a Wireless Local Area Network (WLAN) transceiver and the second transceiver is a cellular communications transceiver.

Example 20 includes the method of any one of examples 11 to 19. In this example, adjusting a phase of the compensation signal includes adjusting the phase based on an operating frequency of the first transceiver or the second transceiver or both.

Example 21 is a tangible, non-transitory, computer-readable medium including instructions that are executable by a processor. The computer-readable medium includes instructions that direct the processor to couple a portion of a transmit signal to a compensation circuitry to generate a compensation signal. The transmit signal is sent from a first transceiver to a first antenna along a first signal path including a first feed. The computer-readable medium also includes instructions that direct the processor to adjust a phase of the compensation signal and couple the adjusted compensation signal to a second signal path. The second signal path couples a receive signal received from a second antenna to a second transceiver through a second feed. The first antenna and second antenna partially overlap. The adjusted compensation signal provides analog cancellation of an interference signal received at the second antenna from the first antenna.

Example 22 includes the computer-readable medium of example 21. In this example, the computer-readable medium includes instructions that direct the processor to control a compensation circuitry to adjust a magnitude of the compensation signal via a variable attenuator included in the compensation circuitry.

Example 23 includes the computer-readable medium of any one of examples 21 to 22. In this example, the computer-readable medium includes instructions that direct the processor to control a compensation circuitry to adjust a magnitude of the compensation signal via a variable directional coupler that couples the first signal path the compensation circuitry.

Example 24 includes the computer-readable medium of any one of examples 21 to 23. In this example, the computer-readable medium includes instructions that direct the processor to control a compensation circuitry to select one of a plurality of Radio Frequency (RF) power splitters of an RF power splitter network to couple the first signal path to the compensation circuitry and provide a course tuning of a magnitude of the compensation signal.

Example 25 includes the computer-readable medium of any one of examples 21 to 24. In this example, the computer-readable medium includes instructions that direct the processor to control a compensation circuitry to decouple the compensation circuitry from the first signal path and the second signal path to deactivate the analog cancellation.

Example 26 includes the computer-readable medium of any one of examples 21 to 25. In this example, the computer-readable medium includes instructions that direct the processor to control a compensation circuitry to adjust the phase of the compensation signal based on an operating frequency of the first transceiver or the second transceiver or both.

Example 27 includes the computer-readable medium of any one of examples 21 to 26. In this example, the computer-readable medium includes instructions that direct the processor to control a compensation circuitry to adjust the phase of the compensation signal based on a change in the transfer function between the first antenna and the second antenna.

Example 28 is an apparatus with a plurality of independent Radio Frequency (RF) systems. The apparatus includes means for sending a transmit signal to a first antenna along a first signal path, and means for receiving a receive signal from a second antenna along a second signal path. The first antenna and second antenna partially overlap. The apparatus also includes means for coupling a portion of the transmit signal to a compensation circuitry to generate a compensation signal, means for adjusting a phase of the compensation signal via the compensation circuitry, and means for coupling the adjusted compensation signal to the second signal path to provide analog cancellation of an interference signal received at the second antenna from the first antenna.

Example 29 includes the apparatus of example 28. In this example, the first antenna and the second antenna are coupled by a choke element at a location where the first antenna and the second antenna overlap.

Example 30 includes the apparatus of any one of examples 28 to 29. In this example, the apparatus includes means for adjusting a magnitude of the compensation signal via a variable attenuator included in the compensation circuitry.

Example 31 includes the apparatus of any one of examples 28 to 30. In this example, the means for coupling a portion of the transmit signal to the compensation circuitry includes a directional coupler.

Example 32 includes the apparatus of any one of examples 28 to 31. In this example, the means for coupling a portion of the transmit signal to the compensation circuitry includes a variable directional coupler, wherein a coupling factor of the variable directional coupler is adjustable to control a magnitude of the compensation signal.

Example 33 includes the apparatus of any one of examples 28 to 32. In this example, the means for coupling a portion of the transmit signal to the compensation circuitry includes an RF power splitter.

Example 34 includes the apparatus of any one of examples 28 to 33. In this example, the means for coupling a portion of the transmit signal to the compensation circuitry includes an RF power splitter network including a plurality of RF power splitters, wherein one of the plurality of RF power splitters is selected to provide a course tuning of a magnitude of the compensation signal.

Example 35 includes the apparatus of any one of examples 28 to 34. In this example, the apparatus includes means for decoupling the compensation circuitry from the first signal path and the second signal path to deactivate the analog cancellation.

Example 36 includes the apparatus of any one of examples 28 to 35. In this example, the means for sending includes a Wireless Local Area Network (WLAN) transceiver and the means for receiving includes a cellular communications transceiver.

Example 37 includes the apparatus of any one of examples 28 to 36. In this example, the means for adjusting the phase of the compensation signal adjusts the phase based on an operating frequency of the first transceiver or the second transceiver or both.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An electronic device with a plurality of independent Radio Frequency (RF) systems, comprising:
   a first antenna coupled to a first transceiver through a first signal path comprising a first feed;
   a second antenna coupled to a second transceiver through a second signal path comprising a second feed,
   wherein the first antenna and second antenna partially overlap;
   compensation circuitry coupled to the first signal path and the second signal path and configured to generate a compensation signal that provides analog cancellation of an interference signal received at the second antenna from the first antenna, the interference signal being received at the second antenna as a result of the first transceiver's transmission and the interference signal being coupled from the first antenna to the second antenna causing the second transceiver to be subjected to the interference signal; and
   a first adjustable directional coupler configured to couple the compensation circuitry to the first signal path,
   wherein the first adjustable directional coupler is configured to have an adjustable coupling factor to electronically adjust an amplitude of the compensation signal based upon a transmission power level used by the first transceiver.

2. The electronic device of claim 1, comprising a choke element that couples the first antenna and the second antenna at a location where the first antenna and the second antenna overlap.

3. The electronic device of claim 1, wherein the compensation circuitry comprises a second adjustable directional coupler configured to couple the compensation circuitry to the second signal path, and further comprising:
   a set of bypass switches configured to decouple the compensation circuitry from the first signal path and the second signal path when the first transceiver is not transmitting as an aggressor to the second transceiver, the decoupling of the compensation circuitry from the first signal path and the second signal eliminating power loss through the first adjustable directional coupler and the second adjustable directional coupler.

4. The electronic device of claim 1, wherein the compensation circuitry comprises a variable phase shifter and a second adjustable directional coupler configured to couple the compensation circuitry to the second signal path.

5. The electronic device of claim 4, wherein:
   the first adjustable directional coupler and the second adjustable directional coupler are coupled to one another via the variable phase shifter,
   each of the first adjustable directional coupler and the second adjustable directional coupler is configured to have a respectively adjustable coupling factor to each electronically adjust the amplitude of the compensation signal, and
   the amplitude of the compensation signal is adjusted exclusively via at least one of the first adjustable directional coupler or the second adjustable directional and without using a separate attenuator.

6. The electronic device of claim 1, comprising a set of switches configured to decouple the compensation circuitry from the first signal path and the second signal path.

7. The electronic device of claim 1, wherein the compensation circuitry comprises a Radio Frequency (RF) power splitter configured to couple the compensation circuitry to the first signal path.

8. The electronic device of claim 1, wherein the compensation circuitry comprises an RF power splitter network configured to couple the compensation circuitry to the first signal path,
   wherein the RF power splitter network comprises a plurality of RF power splitters with different respective power coupling factors, and
   wherein one of the plurality of RF power splitters is configured to tune an amplitude of the compensation signal.

9. The electronic device of claim 1, wherein the first transceiver is a Wireless Local Area Network (WLAN) transceiver, and wherein the second transceiver is a cellular communications transceiver.

10. The electronic device of claim 1, wherein the compensation circuitry is configured to adjust a phase of the compensation signal depending on an operating frequency of the first transceiver and/or the second transceiver.

11. A method of operating an electronic device with a plurality of independent Radio Frequency (RF) systems, comprising:
sending a transmit signal to a first antenna along a first signal path comprising a first feed;
receiving a receive signal from a second antenna along a second signal path comprising a second feed,
wherein the first antenna and second antenna partially overlap;
coupling a portion of the transmit signal to a compensation circuitry through a variable directional coupler to generate a compensation signal,
wherein a coupling factor of the variable directional coupler is adjustable to electronically adjust an amplitude of the compensation signal based upon a transmission power level associated with the transmit signal;
adjusting a phase of the compensation signal via the compensation circuitry; and
coupling the adjusted compensation signal to the second signal path to provide analog cancellation of an interference signal received at the second antenna from the first antenna, the interference signal being received at the second antenna as a result of the transmit signal being transmitted by a transmitter of the electronic device and the interference signal being coupled from the first antenna to the second antenna causing a receiver of the electronic device to be subjected to the interference signal.

12. The method of claim 11, wherein the first antenna and the second antenna are coupled by a choke element at a location where the first antenna and the second antenna overlap.

13. The method of claim 11, comprising adjusting a magnitude of the compensation signal via a variable attenuator included in the compensation circuitry.

14. The method of claim 11, wherein coupling a portion of the transmit signal to the compensation circuitry comprises coupling the transmit signal to the compensation circuitry through a Radio Frequency (RF) power splitter.

15. The method of claim 11, wherein coupling a portion of the transmit signal to the compensation circuitry comprises coupling the transmit signal to the compensation circuitry through an RF power splitter network comprising a plurality of RF power splitters, the method comprising selecting one of the plurality of RF power splitters to tune a magnitude of the compensation signal.

16. The method of claim 11, comprising decoupling the compensation circuitry from the first signal path and the second signal path to deactivate the analog cancellation.

17. The method of claim 11, wherein the first transceiver is a Wireless Local Area Network (WLAN) transceiver and the second transceiver is a cellular communications transceiver.

18. The method of claim 11, wherein adjusting a phase of the compensation signal comprises adjusting the phase based on an operating frequency of the first transceiver and/or the second transceiver.

19. A tangible, non-transitory, computer-readable medium comprising instructions that, when executed by a processor, direct the processor to control a compensation circuitry to:
couple a portion of a transmit signal to a compensation circuitry through a variable directional coupler to generate a compensation signal, the transmit signal being sent from a first transceiver to a first antenna along a first signal path comprising a first feed, a coupling factor of the variable directional coupler being adjustable to electronically adjust an amplitude of the compensation signal based upon a transmission power level associated with the transmit signal;
adjust a phase of the compensation signal; and
couple the adjusted compensation signal to a second signal path,
wherein the second signal path couples a receive signal received from a second antenna to a second transceiver through a second feed,
wherein the first antenna and second antenna partially overlap, and
wherein the adjusted compensation signal provides analog cancellation of an interference signal received at the second antenna from the first antenna, the interference signal being received at the second antenna as a result of the transmit signal being transmitted by a transmitter of the electronic device and the interference signal being coupled from the first antenna to the second antenna causing a receiver of the electronic device to be subjected to the interference signal.

20. The computer-readable medium of claim 19, comprising instructions that direct the processor to control a compensation circuitry to:
adjust a magnitude of the compensation signal via a variable attenuator included in the compensation circuitry.

21. The computer-readable medium of claim 19, comprising instructions that direct the processor to control a compensation circuitry to:
select one of the plurality of Radio Frequency (RF) power splitters of an RF power splitter network to couple the first signal path to the compensation circuitry to tune a magnitude of the compensation signal.

22. The computer-readable medium of claim 19, comprising instructions that direct the processor to control a compensation circuitry to:
decouple the compensation circuitry from the first signal path and the second signal path to deactivate the analog cancellation.

* * * * *